March 17, 1925.  
J. F. SAYLOR  
EDUCATIONAL DEVICE  
Filed Jan. 28, 1922
1,530,418
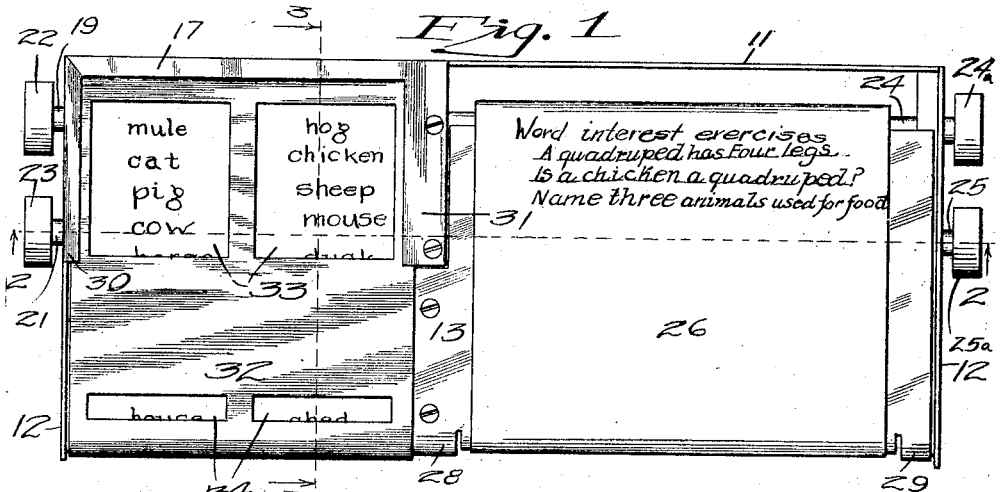
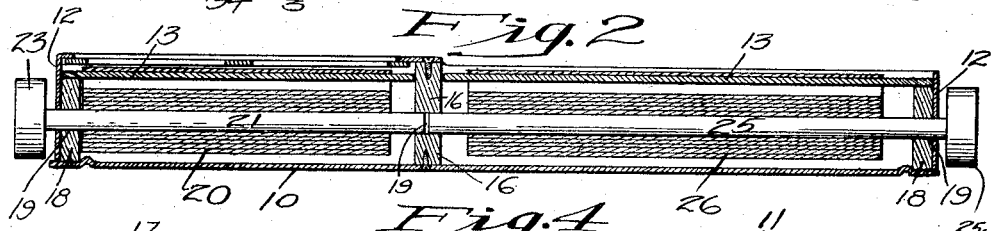
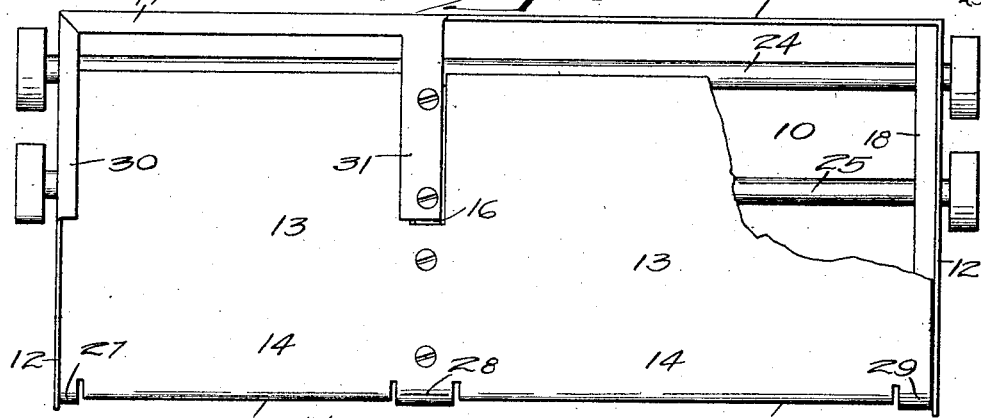
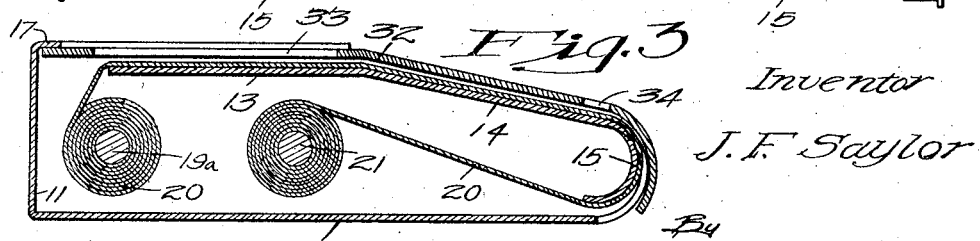
Inventor  
J. F. Saylor  
Witness  
Lynn Latta  
By Bair & Freeman Attys Patented Mar. 17, 1925.

1,530,418

UNITED STATES PATENT OFFICE.

JOHN F. SAYLOR, OF DES MOINES, IOWA.

EDUCATIONAL DEVICE.

Application filed January 28, 1922. Serial No. 532,417.

*To all whom it may concern:*

Be it known that I, JOHN F. SAYLOR, a citizen of the United States, and a resident of Des Moines, in the county of Polk and State of Iowa, have invented a certain new and useful Educational Device, of which the following is a specification.

My invention relates primarily to an apparatus or device for teaching spelling, but broadly it relates to the teaching of any subject matter that lends itself to memory drill exercises.

The primary object of the invention is to do away with the spelling book together with the old long burdensome lists of meaningless words and the old-time interest-killing methods, and in their place put a mechanical device equipped with limited lists of words more immediately suited to the child's age and grade, and at the same time provide a device, which will enlist and call to its aid, the maximum number of the child's instinctive and thought interests.

More particularly, it is my object to provide a device of the kind under consideration, whereby a word or a limited number of words can be made visible at one time, and whereby other words may be left out of the field of vision, when not desired for immediate study, and also to provide further means, whereby certain related "word-interest" studies or lessons may be placed in suitable position with relation to the visible spelling words, so as to be studied in connection therewith.

My device has a number of certain definite and fundamental objective and subjective advantages over the old spelling book system.

A limited, graded list of familiar words adapted to each half or whole year period as desired, is printed on a long scroll and placed in a metal container and is arranged to be properly manipulated by the child. The scrolls are not handled by the child. The metal container can be washed and disinfected. It will thus give a maximum of hygienic protection. The limited use of the paper and the saving of wear and tear on paper binding and covering of a spelling book and the durability of my device gives a maximum of economy. Also a decided economy of the child's time is effected by leading to proper methods and attitudes of study.

Further the same mechanical structure lends itself to a number of subjective advantages. The effective memorizing of the word depends on promoting and conserving interest and attention. The device is planned to this end. The word-interest lessons are intended to attach the story content and interest to any single word or any group of words shown on the spelling device that may be desired. The observation and study of one word at a time avoids the distraction and divided interest and attention which several words would occasion.

The device calls into play the thought-constructive and the instinctive manipulative activities of the child. The turning of each word into view or reversing them for reviews, or again bringing the lessons all into sight through the sight openings 33, again turning a word-interest lesson into view, so as to combine with the proper spelling lesson, all conspire to give the largest measure of constructive activity leading to interest.

The encouragement of constructive activity is still further carried out by the use of a specially devised tablet hereinafter more fully explained.

A specially devised tablet goes with and promotes the proper use of the spelling device. It leads the child to sit at his desk in writing position with the spelling device on the desk in front of him. The use of the tablet leads to a definite plan of study associated with a definite use of the spelling device. Its use too leads to further coordinated manipulation of purposeful activities. The two devices working together seeks to build into the child's life the maximum of effective orderly spelling habits.

Further objects and advantages of my invention will appear in connection with the following description and explanation.

In the accompanying drawings—

Figure 1 shows a top or plan view of the device embodying my invention.

Figure 2 shows a detailed, sectional view taken on the line 2—2 of Figure 1.

Figure 3 shows a transverse, sectional view taken on the line 3—3 of Figure 1.

Figure 4 shows a top or plan view of the device with a corner of the cover member removed.

In the form of my invention shown in the drawings, I use a casing having a bottom 10, a rear wall 11 and end walls 12. The end walls 12 are made readily removable, so as to permit the easy removal or insertion of the rolls hereinafter mentioned.

A top member 13 is provided, which at its forward portion, inclines downwardly and forwardly, as at 14, and terminates in a curved guide portion 15, terminating near the bottom 10. A partition extends from front to rear as indicated at 16 in Figure 2.

At the upper edge of the rear wall 11 is a portion 17 bent over to form a guide for the removable top plate hereinafter described.

Secured to the end members 12 are bars or the like 18. The bars 18 and partition 16 are provided with holes 19 to form bearings for shafts, which will be hereinafter referred to.

It will be noted that the partition 16 divides the casing into right and left compartments.

Mounted in the left-hand compartment is a shaft 19$^a$ on which is rolled a portion of a strip 20 of cloth or suitable paper or the like, which is extended from the shaft 19$^a$ over the cover member 13, and around the forward end of the same and thence over a similar shaft 21 also journaled in the partition 16, and the member 18 and the left-hand member 12.

On the outer ends of the shafts 19$^a$ and 21 are readily removable heads 22 and 23 which may be slipped onto their shafts and held by frictional engagement.

In the right-hand compartment, spaced shafts 24 and 25 are journaled in the members 16 and 18 and the end member 12. On the shafts 24 and 25, outside the casing are heads 24$^a$ and 25$^a$.

On the shaft 24 is mounted a strip 26, which is extended over the member 13 and is then wound on the shaft 25.

It may be mentioned in this connection that at its lower end, the cover member 13 has projecting portions 27, 28 and 29, and that the rear wall member 11 has at its left-hand end, and its central part, guide strips 30 and 31 spaced above the member 13.

A movable cover plate 32 is designed to be slipped under the strips 30 and 31 and to engage the members 27 and 28 to be held slightly spaced above the flexible strip 20.

The cover plate 32 has near its rearward portion laterally spaced sight openings 33, which are substantially square and of the size to expose a certain number of words, as for instance, five, through each opening.

It is understood that words for spelling lessons are printed or otherwise displayed on the strip 20.

Near the forward part of the cover plate 32 are two laterally aligned, relatively narrow openings 34, each adapted to expose to sight, one word on the strip 20.

The strip 26 is designed to carry "word-interest" exercises or lessons relating to the words in lessons correspondingly numbered on the strip 20.

The left compartment of the device contains the list of words to be spelled and the right compartment contains related "word-interest" lesson.

These words are printed on the flexible strip 20, which is of proper length to hold sufficient words or other memory data to employ a class during a period of a half year or a whole year or for any other period, as may be desired.

The "word-interest" lessons on the strip 26 and the lessons on the strip 20 are designed to be arranged so that the strips may be moved either independently or simultaneously in order, for example, to bring into sight the "word-interest" lesson which is appropriate to and coordinates with the spelling lesson visible through the openings 33 or 34.

The strip 20 is advanced or moved back by means of the heads 22 and 23, which, when turned, bring the desired words into the field of vision into slots 33 and 34, and in like manner, the operating of the heads 24$^a$ and 25$^a$ also moves the strip 26 so as to bring the desired corresponding "word-interest" lessons into sight.

When the word is properly studied, it passes out of sight and a new word comes into the field of vision. A specially prepared and coordinated recitation and study tablet accompanies the device. In preparing his lesson, the child observes carefully the new word in the field of vision and writes it as many times as necessary on his tablet. Then in addition, the tablet calls for a writing of the new word accompanied by the previous word, which has been removed from sight. With each new word, the child will accompany it on his tablet with a review or reproduction from memory of the previous words.

In this way, the child is forced to intensively exercise memory and direct observation conjointly.

From start to finish, the work is constructive and therefore interest compelling in its nature.

It not only encourages, but requires correct posture during either the study or recitation periods. Correct position is fundamental to interested work. Both the device and tablet must be placed on the desk with the pupil in a writing position.

Some changes may be made in the arrangement and construction of the various parts of my device, whereby the objects contemplated are attained, without departing from the essential features and purposes of my invention, and it is my intention to cover by my claims, any modified forms of structure or use of mechanical equivalents, which may be reasonably included within their scope.

I claim as my invention:

1. An educational device adapted for use by pupils on their desks for study purposes, comprising a casing having a rear wall, a bottom and side walls, a top member for said casing terminating short of the rear wall and curved to form a front wall for the casing, the lower part of said curved portion being spaced above the bottom, laterally spaced pairs of rollers, exhibitors on the respective pairs of rollers having drill lessons on the one and word-illustrating and explanatory matter on the other exhibitor, said exhibitors being extended over said cover and between the rollers of the respective pairs, a removable cover above one of said exhibitors spaced above said first cover, provided with sight openings.

2. An educational device comprising a casing of size and shape for convenient use and manipulation by a child, exhibitor elements movably and removably arranged therein in a substantially horizontal plane, having thereon respectively a graded series of spelling lessons and a series of co-ordinating "word interest" lessons, a removable support underlying stretches of the exhibitors, and a removable cover for one exhibitor having sight openings arranged to permit observation of one word at a time in one place and of a group of words in another place.

Des Moines, Iowa, September 22, 1921.

JOHN F. SAYLOR.